United States Patent [19]

Matsumoto et al.

[11] Patent Number: 5,261,048

[45] Date of Patent: Nov. 9, 1993

[54] STILL IMAGE FILING SYSTEM

[75] Inventors: Akihiko Matsumoto; Fumihiro Nagasawa, both of Kanagawa, Japan

[73] Assignee: Sony Corporation, Tokyo, Japan

[21] Appl. No.: 508,354

[22] Filed: Apr. 12, 1990

[30] Foreign Application Priority Data

Apr. 27, 1989 [JP] Japan .................................. 1-108760

[51] Int. Cl.⁵ .............................................. G06F 15/62
[52] U.S. Cl. ................................................... 395/164
[58] Field of Search .............................. 395/144–149, 395/155, 161, 164; 358/209, 903, 149

Primary Examiner—Heather R. Herndon
Attorney, Agent, or Firm—Lewis H. Eslinger; Jay H. Maioli

[57] ABSTRACT

A still image filing system stores still picture data representing a still image and controls the still picture data. The apparatus has an input circuit for the still picture data, a first memory, a separable second memory, and an output circuit for the still picture data and a first central processing unit (CPI) for controlling the operation of the apparatus. A control unit is provided having a second CPU and a color display apparatus, and the apparatus further includes a video bus through which the still picture data is transmitted in real time. The input and output circuits are connected to the video bus.

10 Claims, 11 Drawing Sheets

STILL IMAGE FILING SYSTEM

BACKGROUND OF THE INVENTION

1. Field of the Invention

The present invention relates generally to still image filing system and, more particularly, is directed to a still image filing system for use in transmitting Telop (television opaque) in a television broadcasting station.

2. Description of the Background

It has been previously proposed to transmit a Telop (television opaque) or the like by utilizing a still image filing apparatus having a digital memory in a television broadcasting station.

In a previously proposed still image filing apparatus, a still image to be filed is supplied to a bus of a central processing unit (CPU) that controls the operation of the still image filing apparatus by a direct memory access (DMA) operation. The still image supplied to the bus is processed by the CPU with some suitable processing such as editing the still image or the like, and is then written to a file memory.

In the aforesaid previously described still image filing apparatus, the CPU bus is also employed as a bus of a video signal of the still image. Therefore, when the still image is processed, other operations on the video signal cannot be performed. Further, this processing operation is time consuming so that the overall operation of the still image filing apparatus in the prior art needs a lot of time.

Further, in the prior-art still image filing apparatus, many procedures are needed in order to perform edition, filling or transmission of the still image. Further, the procedures require the user to be skilled in that work, which makes it difficult and annoying to the user of the system.

OBJECTS AND SUMMARY OF THE INVENTION

Accordingly, it is an object of the present invention to provide a still image filing system which overcomes the aforenoted drawbacks and disadvantages encountered in the prior art.

Another object of this invention is to provide a still image filing system in which only simple sequences of operation are required to perform a desired procedure, such as editing, filing or transmitting.

A further object of this invention is to provide a still image filing system in which the operational speed is relatively high.

As an aspect of this invention, a still image filing system for storing still picture data representing the still image and for controlling the still picture data is comprised of a still image filing apparatus having an input circuit for the still picture data, a first memory, a separable second memory, an output circuit for the still picture data and a first central processing unit (CPU) for controlling the operation of the still image filing apparatus, and a control unit having a second CPU and a color display apparatus, wherein the still image filing apparatus includes a video bus through which the still picture data is transmitted in real time to which the input and output circuits are connected to the video bus.

BRIEF DESCRIPTION OF THE DRAWINGS

A better understanding of the objects, features and advantages of the invention can be gained from a consideration of the following detailed description of the preferred embodiment thereof, in conjunction with the figures of the accompanying drawings, wherein.

DETAILED DESCRIPTION OF A PREFERRED EMBODIMENT

Figure 1:
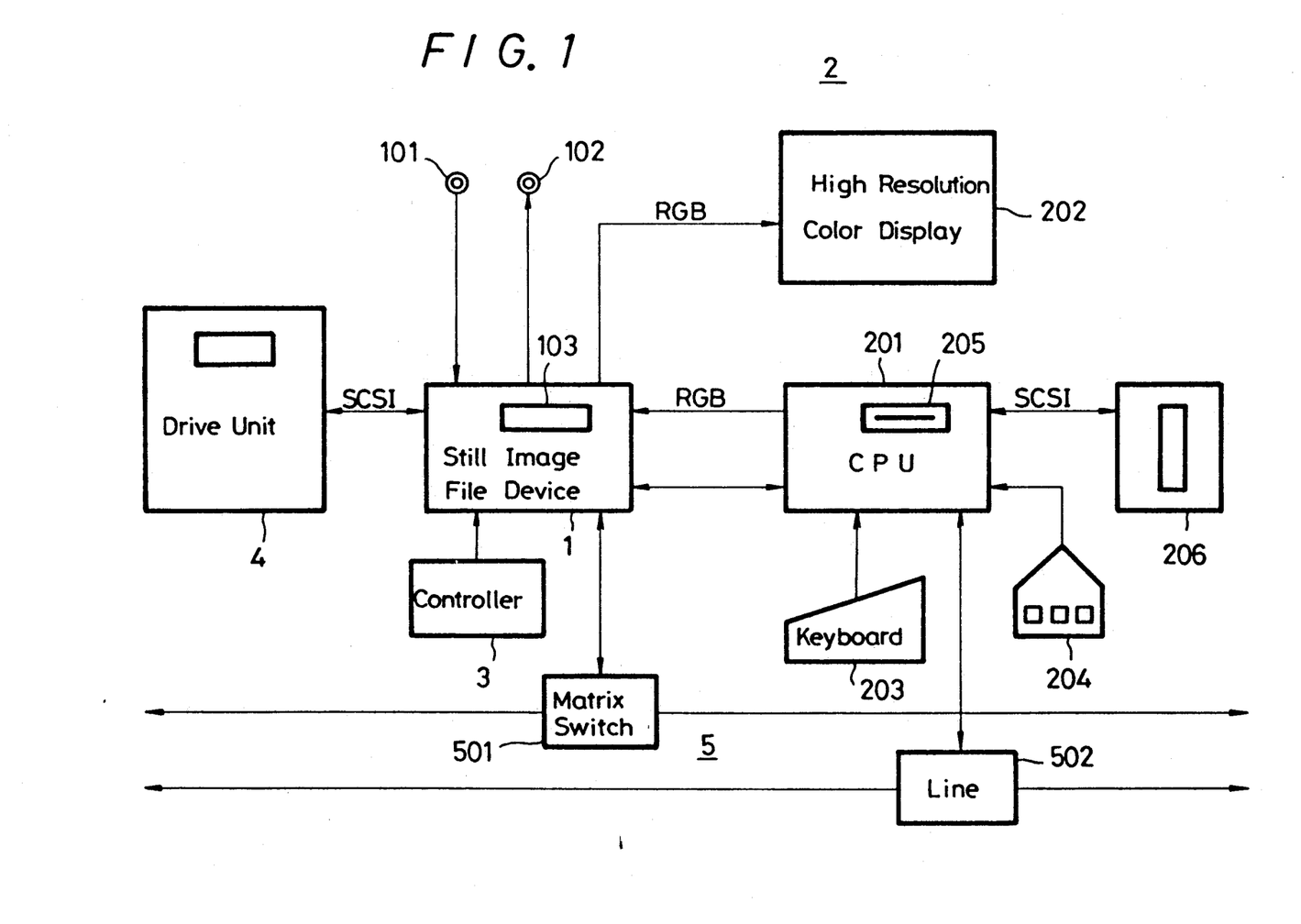
FIG. 1 is a total block diagram of one embodiment of a still image filing system in accordance with the present invention.

Referring to the drawings in detail, and initially to FIG. 1, there is shown a still image filing device 1 which is provided with an input section 101 and an output section 102 for a certain video signal. The still image filing device 1 further includes a drive section 103 which drives a separable memory such as a magneto-optical (MO) disc.

The still image filing device 1 is connected with a central processing unit (CPU) 201 in a work station 2, and an RGB video signal, for example, from the work station 2 is supplied to the still image filing device 1. An RGB video signal from the still image file device 1 is supplied to a high definition color display 202 in the work station 2. The CPU 201 is connected with a keyboard 203 and a mouse 204 and is provided with a floppy disk drive section 205 which drives a so-called 3.5-inch floppy disk. The CPU 201 is further provided with a magneto-optical disc drive section 206 which backs-up a data base and so on.

The still image filing device 1 is connected with a controller 3 that function as one portion of the CPU 201 of the work station 2 and a drive apparatus 4 which drives an external storage disk, such as, a magneto-optical disc having an auto-changer or a so-called write once (WO) disc.

Further, the video signal data from the still image filing device 1 is supplied to a matrix switch 501 which is part of a network 5, and the output of the CPU 201 of the work station 2 is supplied to a line 502 of the network 5.

Figure 2:
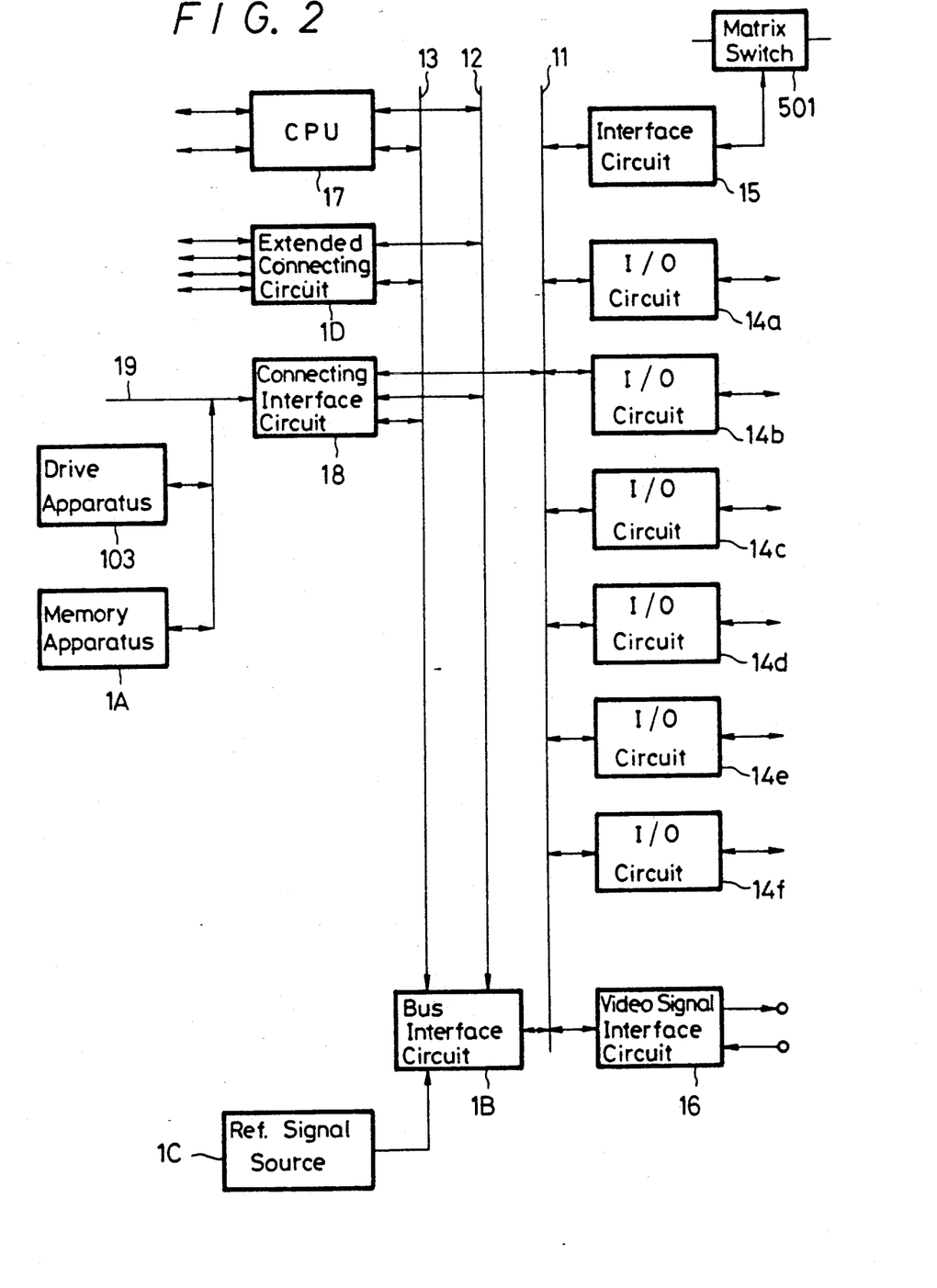
FIG. 2 is a block diagram of a still image file device 1 shown in FIG. 1.

In this apparatus, the still image filing device 1 is constructed as shown in FIG. 2.

Referring to FIG. 2, there is provided a video bus 11 which can transfer in real time component digital video data according, for example, to the D-1 standard. A first control bus 12 is provided, to transfer real time control data or the like which data can be added to the video signal. A second control bus 13 is provided, to transfer control data of the apparatus.

The video bus 11 is connected with a plurality of I/O circuits 14a, 14b, ... 14f to and/or from which the video signal is inputted and/or outputted. The video bus 11 is also connected with an interface circuit 15 for connecting matrix switch 501 of the network 5 and a video signal interface circuit 16 of the work station 2.

A central processing unit (CPU) 17 is provided to control the operations of the still image filing device 1. The CPU 17 is connected with the data line of the CPU 201 of the work station 2 and the data line of the controller 3. The data line of the CPU 17 is connected to the control bus 12 and control data from the CPU 17 is supplied to the control bus 13.

There is shown a connecting interface circuit 18 to which there is connected, for example, a small computer system interface (SCSI) bus 19. This SCSI bus 19 is connected with the above-described drive apparatus 103 and with a memory apparatus 1A such as a hard disc drive apparatus for a built-in memory or random access memory (RAM). The SCSI bus 19 is further connected with the external drive apparatus 4 or the like (not shown). The connecting interface circuit 18 is controlled by the control buses 12 and 13, and the SCSI bus 19 and the video bus 11 are connected with each other via the connecting circuit 18.

The control bus 12 is connected to an bus interface circuit 1B. When the bus interface circuit 1B is supplied with a reference synchronizing signal from a reference signal source 1C, the video bus 11 and the control bus 12 are connected during a predetermined one horizontal period within, for example, a vertical blanking period. In FIG. 2, reference numeral 1D designates an extended connecting circuit.

Figure 3:
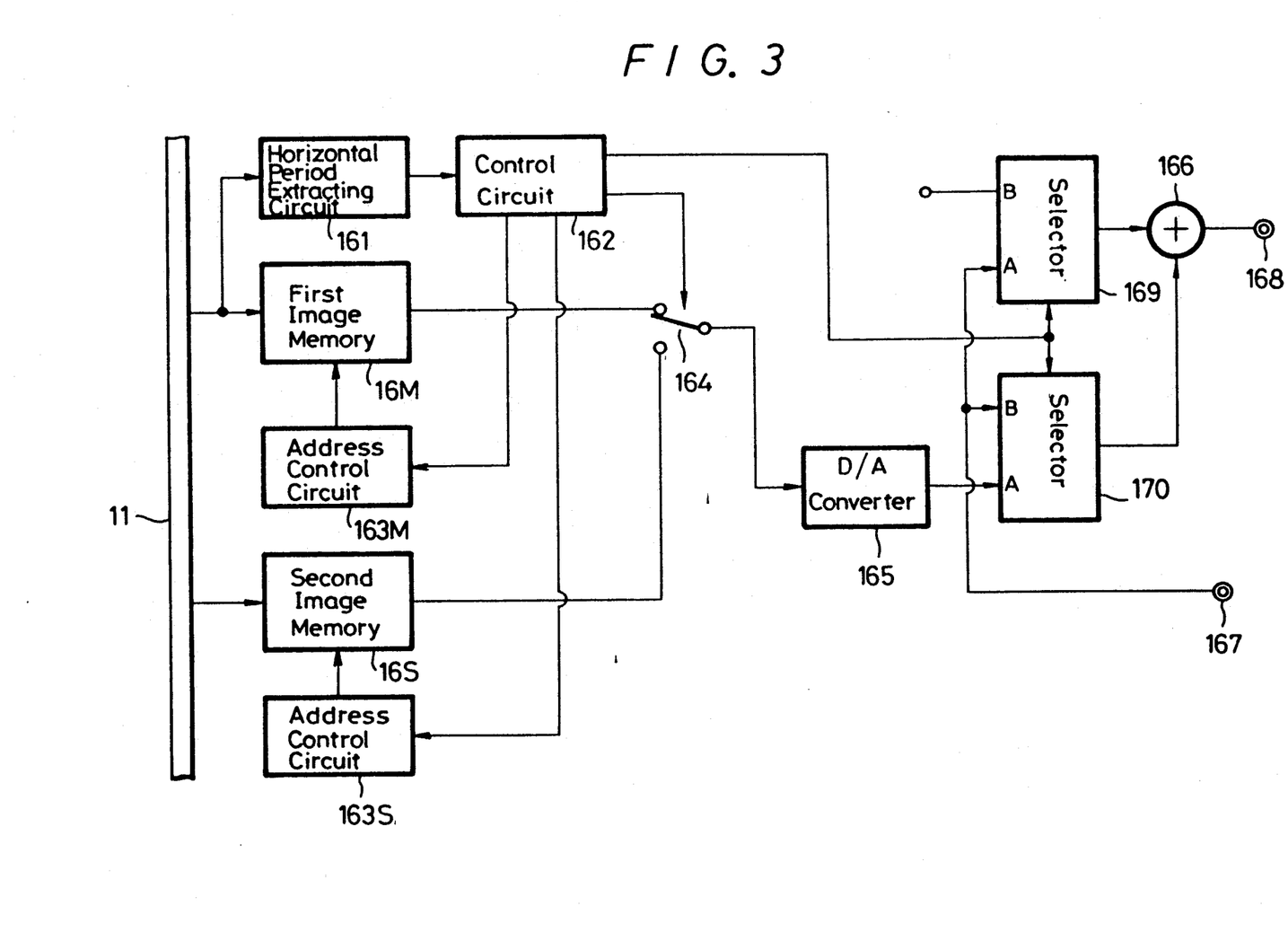
FIG. 3 is a block diagram of a video signal interface circuit 16 shown in FIG. 2.

Further, in the still image filing device 1, the above-described interface circuit 16 is constructed as shown in FIG. 3.

More specifically, in this interface circuit 16, there are provided a first image memory 16M corresponding to all pixels of high resolution of the color display 202, and a second image memory 16S corresponding to one frame time of the video signal. These memories 16M and 16S are supplied with data of the video bus 11. The data of the video bus 11 is supplied to a horizontal period extracting circuit 161 which extracts a predetermined assigned horizontal period within a vertical blanking period. This horizontal period extracting circuit 161 will be described more fully later. Control data superimposed upon the extracted horizontal period extracted by the circuit 161 is supplied to a control circuit 162, and a signal from the control circuit 162 is supplied to address control circuits 163M and 163S, whereby data are written in and/or read out from the memories 16M and 16S, respectively.

Accordingly, in the memory 16M there is formed a video image such as a still image or the like that is latched in advance by the signal, for example, from the connecting circuit 18. Whereas, the video signal supplied to any one of the I/0 circuits 14a to 14f is analog-to-digital (A/D)-converted and is supplied to the video bus 11. This video signal is sequentially supplied to the memory 16S. The signals written in the memories 16M and 16S are read therefrom in response to the signals from the control circuit 162. Further the signals read-out from the memories 16M and 16S are switched by a switch 164 to mix the signals. The mixed signal is supplied through a D/A converter 165 and one input terminal A of a selector 170 to a mixer 166, in which it is mixed with an output of another selector 169. The mixed signal from the mixer 166 is fed through an output terminal 168 to the color display 202 (see FIG. 1). The selector 170 is supplied at the other input terminal B thereof with the signal from the CPU 201 (see FIG. 1) through a terminal 167, whereby the switching of the signal between input terminal A or input terminal B is performed on the basis of the selection signal from the control circuit 162. The selector 169 is supplied at one input terminal A with the signal from the CPU 201 and is also supplied at the other input terminal B with a black level signal, whereby the switching of the signal between input terminal A or input terminal B is performed on the basis of the control signal from the control circuit 162 similarly to the selector 170.

Figure 4:
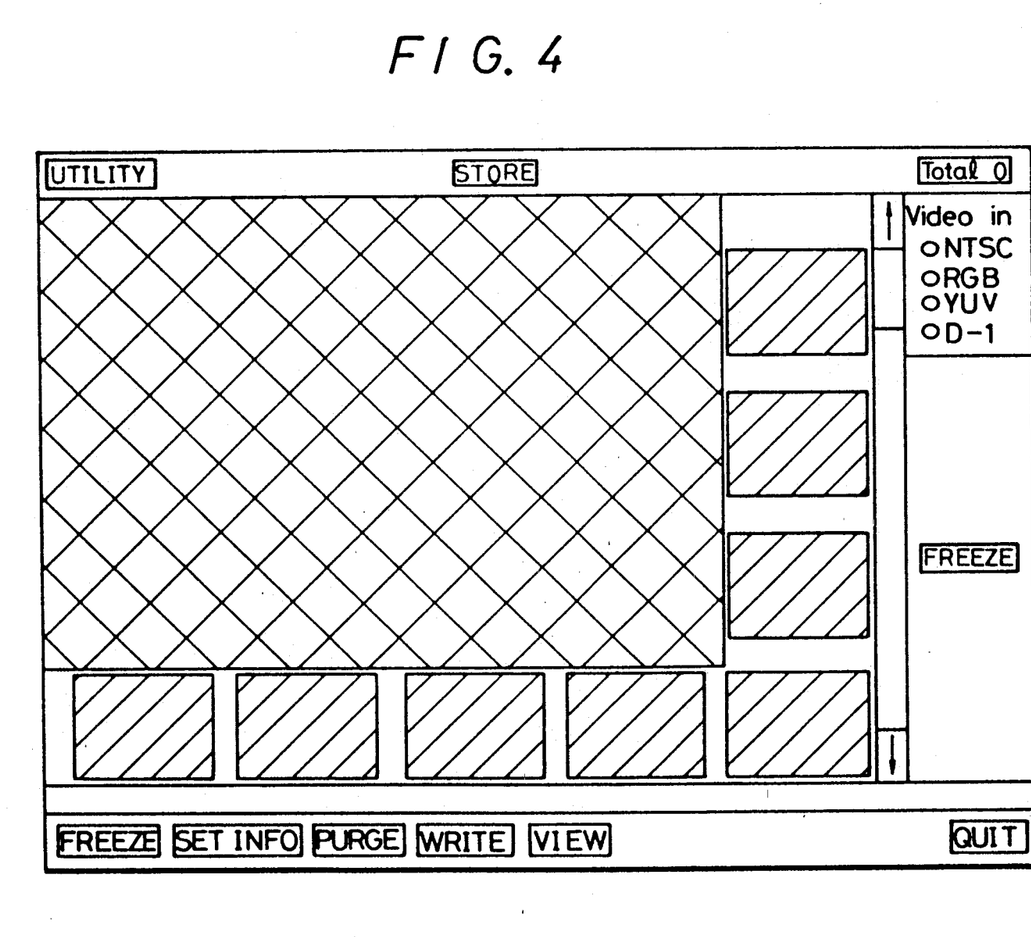
FIG. 4 is a schematic diagram useful in understanding the operation of the embodiment shown in FIG. 1.

In the interface circuit 16, the signal supplied to the terminal 167 from the CPU 201 is provided with information, which is formed by the CPU 201, and a predetermined black level signal formed at the cross-hatched portion as shown in FIG. 4. Whereas, when the mixed signal from the switch 164 is switched by the selector 170 on the basis of the selection signal corresponding to the range of black level supplied from the control circuit 162, a video image in which a certain picture is mixed into the cross-hatched area is formed. Further, the selector 169 derives a signal indicative of the cross-hatched area from the CPU 201, and this signal is mixed with the signal from the selector 170 by the mixer 166 so that, when a cursor or the like is moved, for example, the mouse 204 (see FIG. 1), is moved in the hatched area, this can also be displayed. Clamping circuits or like may be connected to the output terminals of the selectors 169 and 170 so as to adjust the signal level, respectively.

Figure 5:
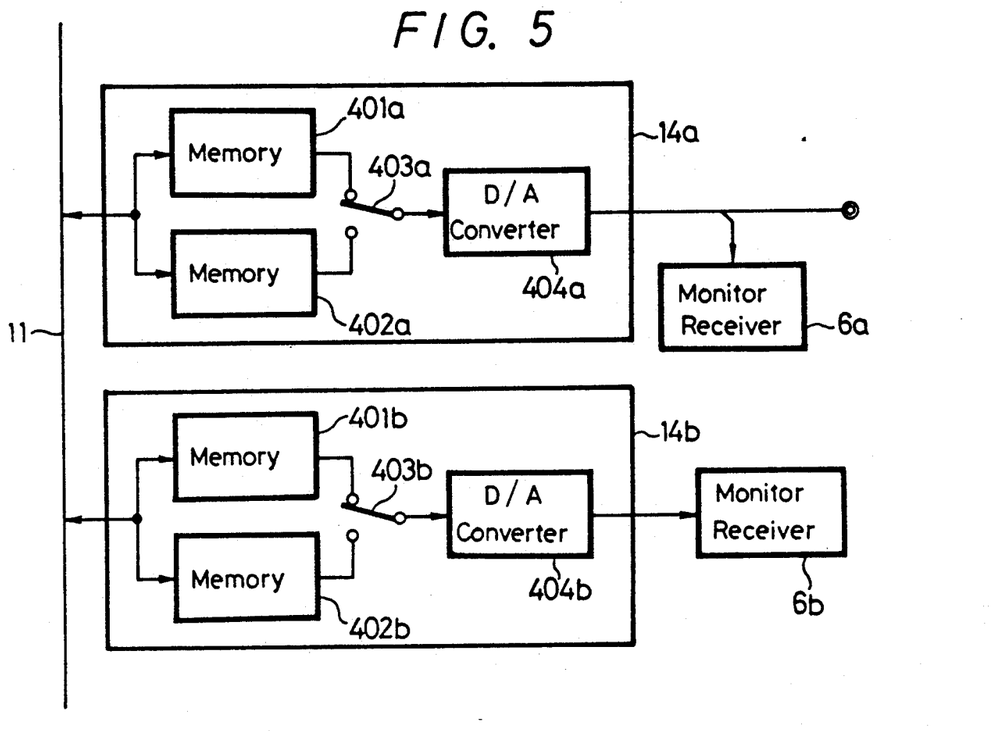
FIG. 5 is a block diagram of an I/0 circuit 14 shown in FIG. 2.

In the afore-noted apparatus, the I/0 circuits 14a to 14f are respectively connected with the memories having storage capacity corresponding to two still images. For example, when the I/0 circuits 14a and 14b transmit still images in the sequential order of A, B, C and D, as shown in FIG. 5, the still image A is first transferred to a memory 401a of the I/0 circuit 14a, the still image B is transferred to a memory 402a of the I/0 circuit 14a and to a memory 401b of the I/0 circuit 14b and the still image C is supplied to a memory 402b of the I/0 circuit 14b. Further, the memory 401a is selected by a switch 403a provided in the I/0 circuit 14a, thereby the still image A is transmitted through a D/A converter 404a, whereas the memory 401b is selected by a switch 403b provided in the I/0 circuit 14b, thereby the still image B is displayed on a monitor receiver 6b through a D/A converter 404b. In this case, a monitor receiver 6a may be provided so as to display the still image transmitted from the I/0 circuit 14a. When the next still image B is transmitted, the switches 403a and 403b are selectively changed-over to select the memories 402a and 402b, whereby the still image B is transmitted and the still image C is displayed on the monitor receiver 6b. At that time, the still image C is transferred to the memory 401a and the still image D is transferred to the memory 401b.

Further, in the above-described apparatus, simple commands can be issued from the work station 2 when a packet transmitted is furthermore, by providing the controller 3 with only the transmission function, it is possible to carry out only the transmission without using the work station 2.

Figure 6:
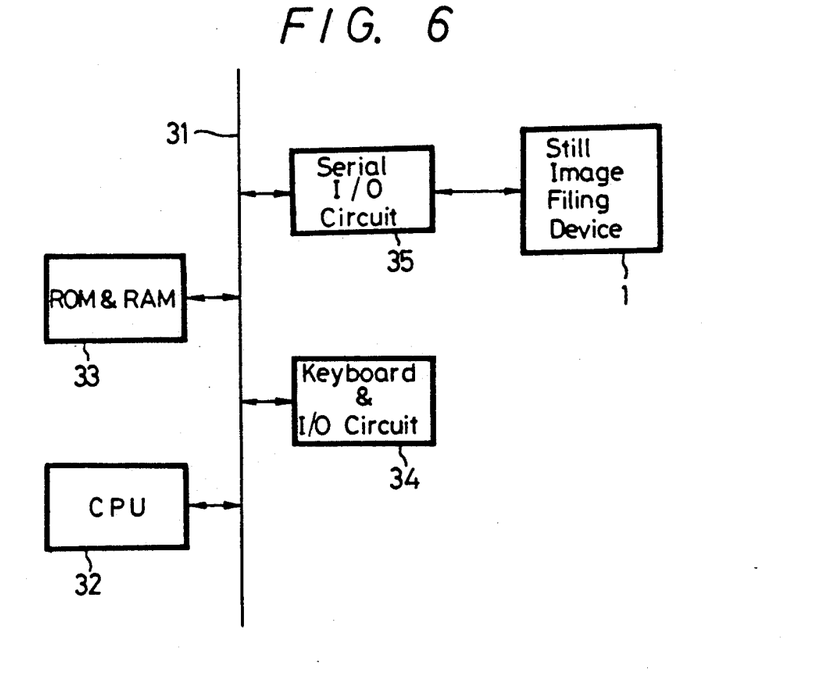
FIG. 6 is a block diagram of a controller 3 shown in FIG. 1.

FIG. 6 shows the arrangement of the controller 3 for that purpose. As FIG. 6 shows, a CPU 32, a memory 33 for ROM and RAM and a keyboard and I/0 circuit 34 are connected to an internal bus 31, whereby data inputted by operating the keyboard 34 is converted to predetermined control data in accordance with a program stored in the ROM 33. Then, this control data is transferred through a serial I/0 circuit 35 to a CPU 17 in the still image filing device 1, thereby the still image of packet being transmitted.

In the above-described apparatus, the video bus 11 is provided in the still image filing device 1 and the real time data can be transferred so that the still images can be transferred from the memory apparatus 1A to the I/0 circuits 14a to 14f in quite a short period of time as compared with the transmission of still images from the respective circuits. Therefore, if a plurality of packets are stored in the memory apparatus 1A, these packets can be independently transferred to the I/0 circuits 14a to 14f. To this end, if controllers (not shown) are provided for the respective packets and the respective I/0 circuits 14a to 14f, then the operation becomes easier. For this reason, the above-mentioned apparatus is provided with the extended connecting circuit 1D to which there can be connected four controllers.

As described above, according to the above-described apparatus, the work station is provided together with the still image filing device, whereby function such as editing or the like can be carried out at the work station with ease. Further, the video bus and the first and second control buses are provided in the still image filing device so that the transfer of the still image or the like can be performed very smoothly.

Further, in the above-described apparatus, a network can be constructed by connecting a plurality of still image filing devices 1 and the work stations 2 with one another.

Figure 7:
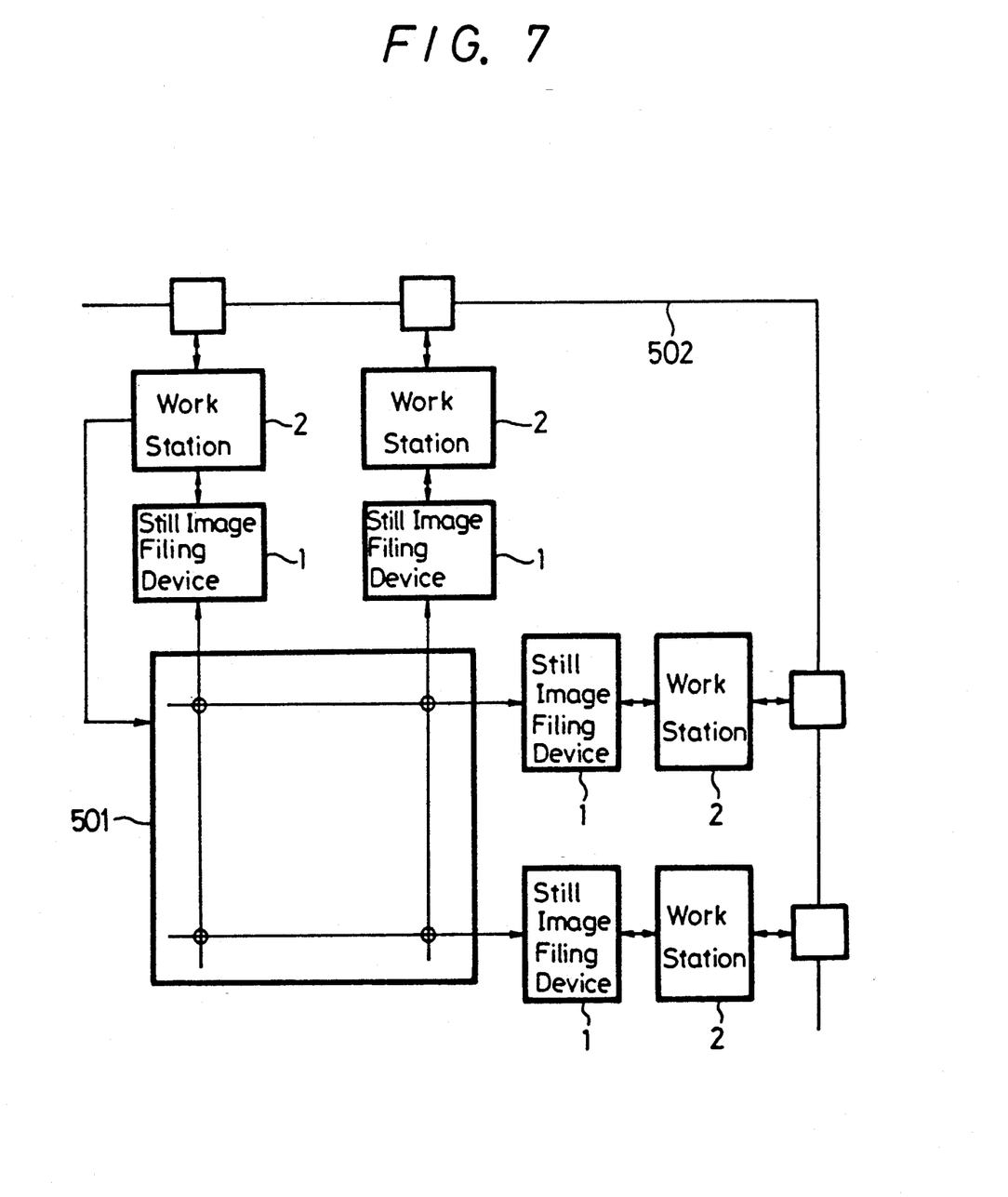
FIG. 7 is a block diagram for explaining the operation of a network 5 shown in FIG. 1.

More specifically, as shown in FIG. 7, when there are provided four still image filing devices 1 and the work station 2, the video signals of the respective still image filing devices 1 are connected to the matrix switch 501, and the CPU outputs from the respective work stations 2 are connected, for example, to the line 502 for Ethernet LAN (developed by the Xerox Corporation). Then, the matrix switch 501 is controlled by a work station of a host apparatus. Thus, the network is constructed among the work stations, whereby control data is transmitted from a certain work station to the host work station, thereby the video buses of desired still image filing devices being connected with each other on the network. Therefore, a still image filed in any apparatus can be transferred and utilized by other apparatus via the matrix switch 501.

In the still image filing device 1 and in the overall apparatus as described above, the still image is latched as follows.

More specifically, as shown in FIGS. 1 to 3, the video signal supplied to any one of the I/0 circuits 14a to 14f is analog-to-digital-converted and fed to the video bus 11. The signal on the video bus 11 is supplied through the image memory 16S of the interface circuit 16 to the color display 202 of so-called high resolution display and is thereby displayed on one portion of a display screen of the color display 202. At that time, on another portion of the display screen, there is displayed a still image or the like to be edited, derived from the image memory 16M, which will be described later.

Under this condition, a predetermined command is issued by the mouse 204 or the like when a desired image is displayed, this command is supplied through the CPU 201 to the CPU 17 of the still image filing device 1. The CPU 17 forms control data in response to the command in order to stop the supply of the signal to the video bus 11 for the I/0 circuits 14a to 14f. Then, the CPU 17 forms control data by which the signal within the interface circuit 16 is read to the video bus 11 and the read signal is written in the memory apparatus 1A through the connecting circuit 18. The control data are supplied to the connecting circuit 18 from the CPU 17 through the control bus 13, whereas the control data outputted to the control bus 12 is supplied through the interface circuit 1B to the video bus 11 so that this control data is supplied to the I/0 circuits 14a to 14f and the interface circuits 15 and 16, thereby the control data superimposed upon the video signal being supplied to the respective circuits. In that case, a predetermined horizontal period within the vertical blanking period is assigned to the respective I/0 circuits 14a to 14f and to the interface circuits 15 and 16. Thus, when the bus interface circuit 1B outputs control data during the timing of a particular horizontal period in response to the reference synchronizing signal from the reference signal source 1C, the supply of control data to the respective circuits is carried out.

The still image is latched as described above. After the still image is latched, the inhibition of the I/0 circuits 14a to 14f is released and either the video signal is displayed on the color display 202 or the still image written in the memory apparatus 1A is displayed on the color display 202. The still image latched in that case is an index picture in which pixels are extracted having a predetermined ratio together with a full picture formed of all pixels of one frame.

For the still image latched, a certain information for search is determined as follows.

Figure 8:
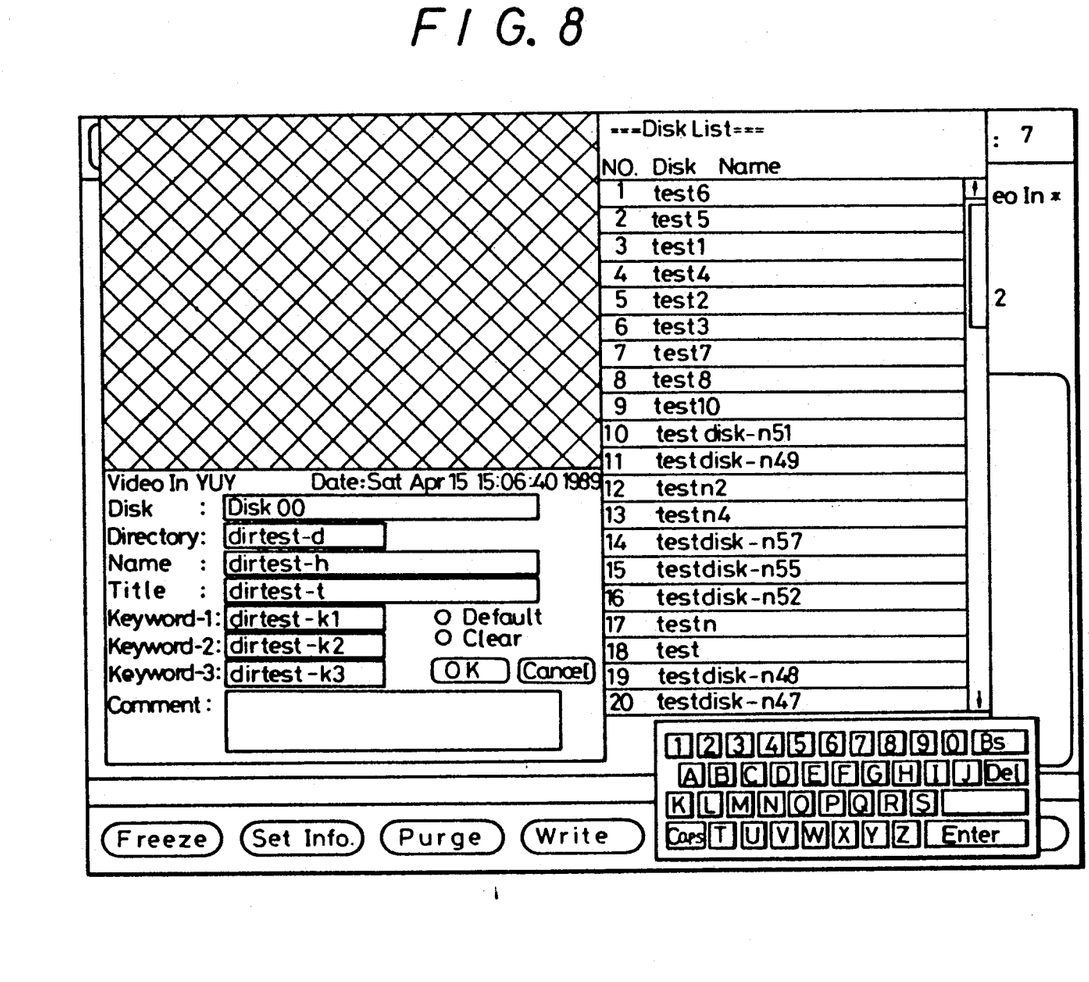
FIG. 8 is a schematic diagram useful in understanding the operation of the embodiment shown in FIG. 1

More specifically when the full picture of a certain still image latched is written in the image memory 16S and an information setting command (Set Info.) is issued by the CPU 201 of the work station 2 under this condition, the color display 202 displays a picture in which a video signal (still image) formed by the still image filing device 1 is displayed on the cross-hatched portion of the display and a video signal (information) formed by the CPU 201 is displayed on the other portion of the display in a superimposed condition as shown in FIG. 8.

Under this condition, disc name, directory, user's name, title, three key words, a certain piece of information such as a comment or the like are determined by the keyboard 203 and displayed on respective rows under a still picture (portion shown by cross hatch). According to this set of information, a descriptor to be added to the still image is formed.

Figure 9:
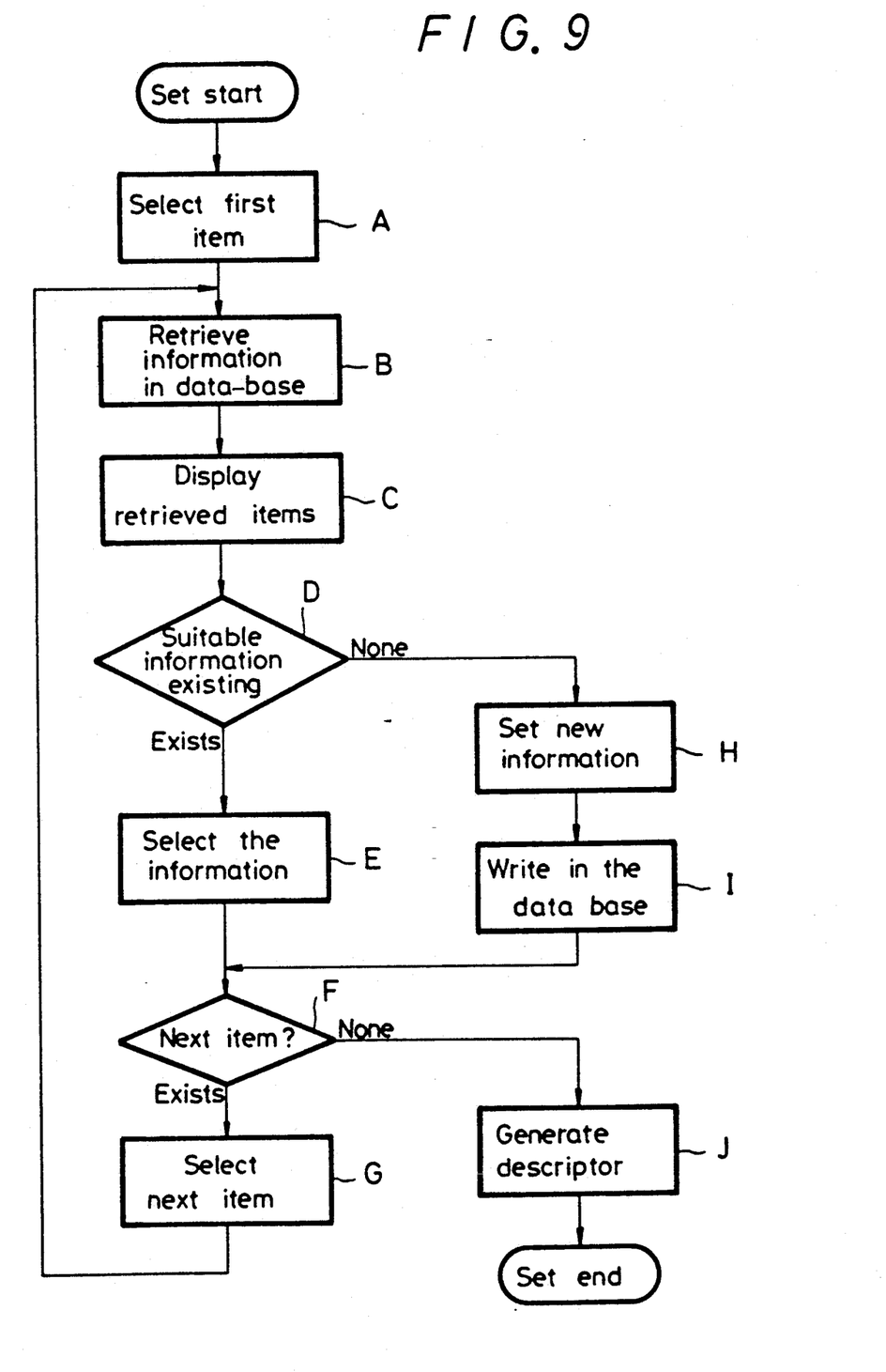
FIG. 9 is a flow chart for explaining the set operation in the embodiment shown in FIG. 1.

By this descriptor, a predetermined data base is formed within the CPU 201, and when the above-described information is set, an operation shown in a flow chart of FIG. 9 is performed by in the data base.

Referring to FIG. 9, following the set start, a first item (row) to be set is selected at step A. Then, the processing proceeds to the next step B in which information, previously-set, is retrieved in the data base. Then, the thus searched items are displayed, for example, at the right-hand side of the still picture displayed on the display screen at step C. The processing proceeds to the next decision step D whereat it is determined whether or not suitable information exists in the items. If suitable information exist as represented by a YES at step D, the processing proceeds to the next step E, where the information is selected. Then, the processing proceeds to the next decision step F where it is determined whether or not the next item exists. If the next item exists as represented by a YES at step F, then the processing proceeds to step G where the next item is selected. Then, the processing returns to the step B.

If suitable information does not exist as represented by a NO at step D, then the processing proceeds to step H, in which a new information is determined. Then, the processing goes to step I, where the thus selected new information is written into the data base. Then, the processing proceeds to the next decision step F. If it is determined that the next item does not exist as represented by a NO at step F, the processing proceeds to step J. In step J, a descriptor is generated on the basis of the information thus set at step J, and the processing is ended.

From, the descriptor thus formed, the full picture and the index picture are written in the memory apparatus 1A according to a predetermined format. In this format, the descriptor, the full picture and the index picture are written in independent areas, from the addresses corresponding to the full picture and the index picture which are provided within the descriptor, respectively. In this case, the index picture may be formed by either connecting a desired hardware to the video bus 11 or using software in the CPU 17 and connecting the hardware or software to the connecting circuit 18. Further, the still image written in the memory apparatus 1A may be transferred to and stored in the drive apparatus 103, which drives the magneto-optical disc, and this magneto-optical disc can be removed therefrom to be utilized by other apparatus.

The still image written in independent areas, as described above, is edited as follows.

Figure 10:
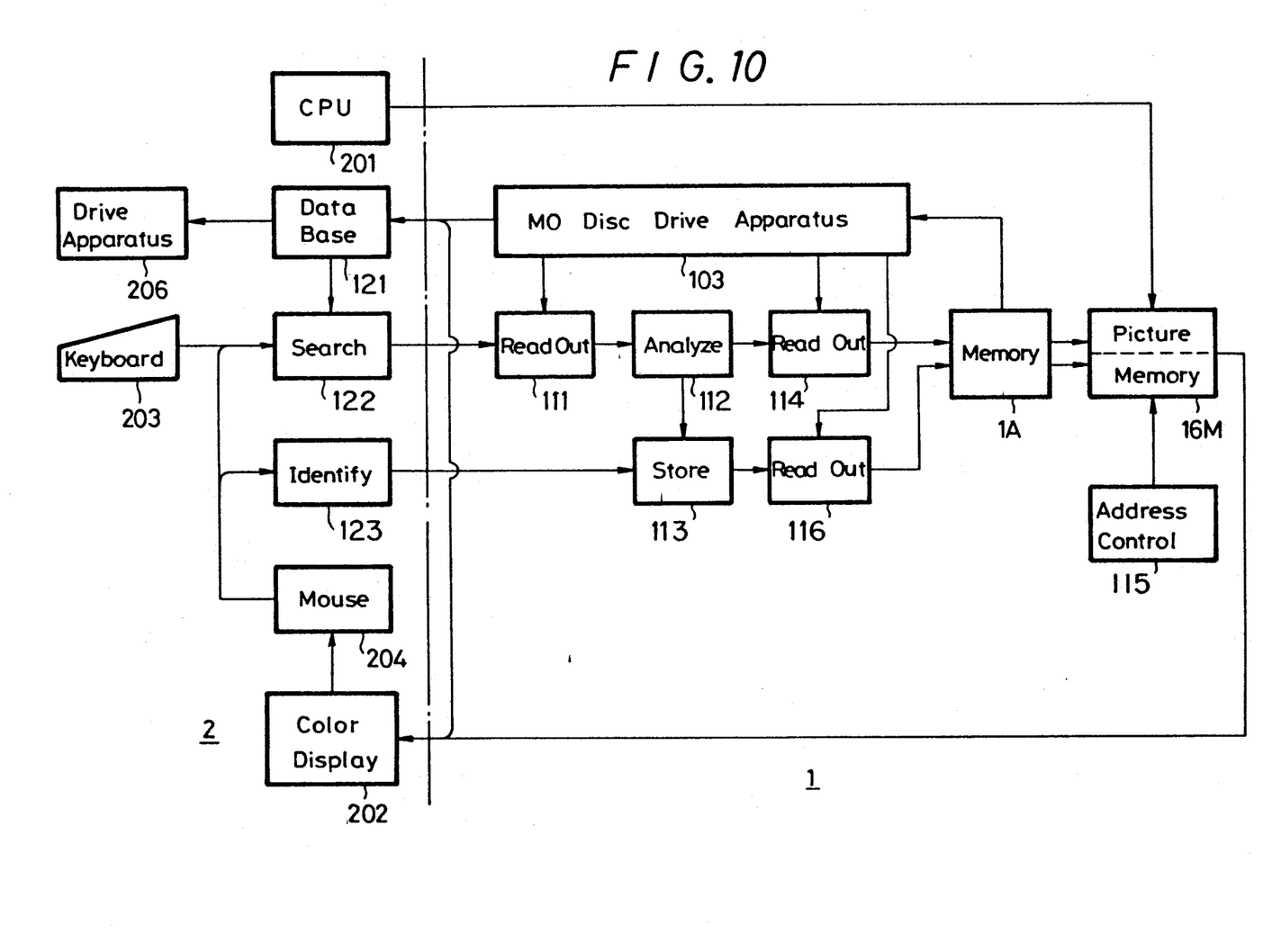
FIG. 10 is a functional block diagram for explaining the edit operation in the embodiment shown in FIG. 1.

FIG. 10 is a functional block diagram of the still image filing apparatus of the present invention. As shown in FIG. 10, when the magneto-optical disc in which a plurality of still images are written as described above is loaded on the magneto-optical disc drive apparatus 103, a data base operating on a classification code for retrieving data is generated 121 from the descriptor on the magneto-optical disc in the work station 2. An image based on the data base is displayed on the color display 202 and a search 122 can be carried out by the keyboard 203 or the mouse 204. Then, in accordance with the classification code thus searched or the like, a descriptor of corresponding still image is read-out 111 from the magneto-optical disk drive apparatus 103 by the still image filing device 1.

Figure 11:
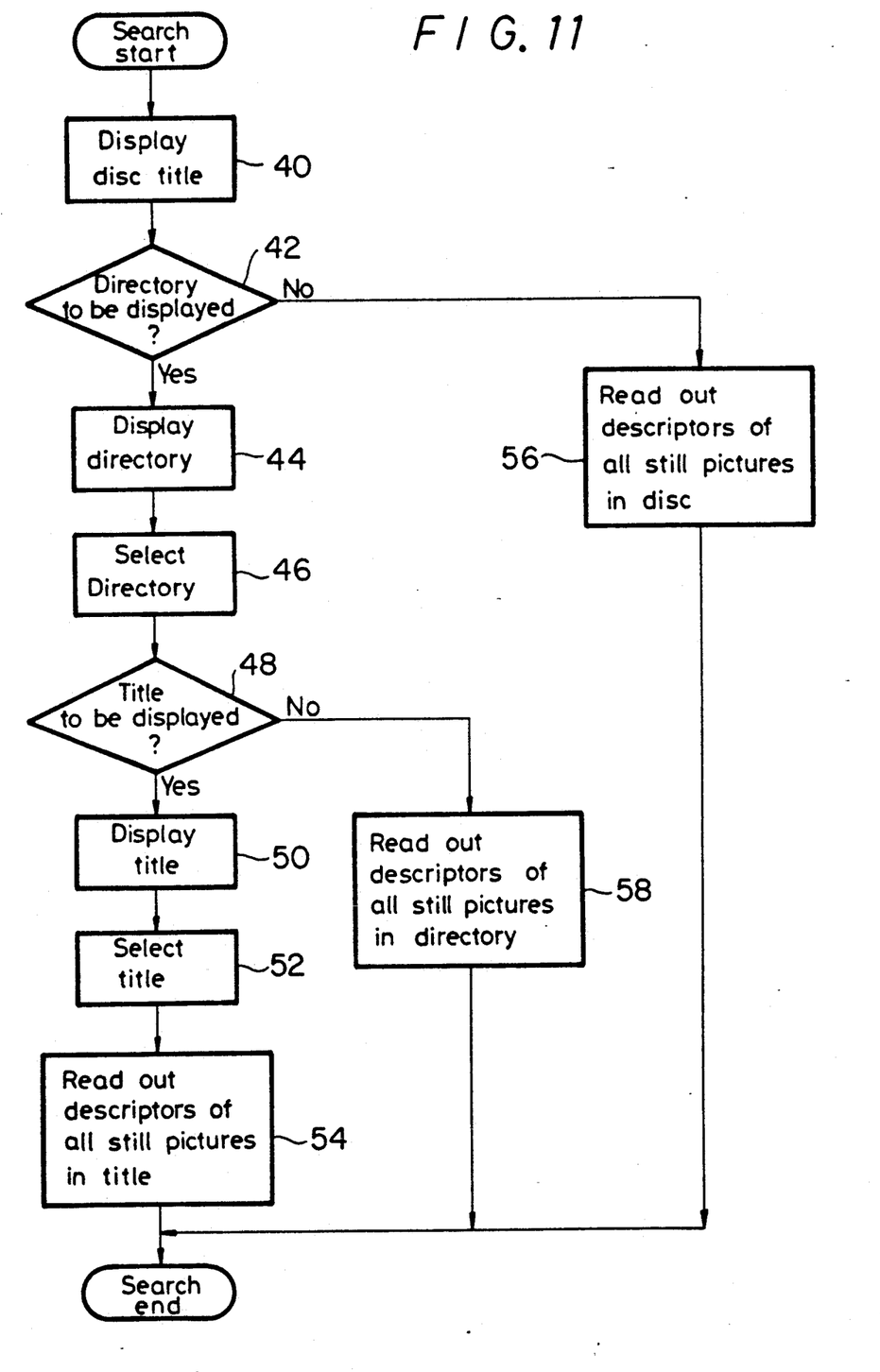
FIG. 11 is a flow chart for explaining the search operation in the embodiment shown in FIG. 1.

The search 122 is carried out in accordance with a flow chart as shown in FIG. 11.

Referring to FIG. 11, following the search 122 start, a disc title to be searched is displayed on the color display 202 at step 40. Then, the processing proceeds to the next decision step 42, at this step it is determined whether or not a directory is to be displayed or not. If the user selects a YES at step 42 with the keyboard 203 or the like, then the processing proceeds to step 44 whereat the directory is displayed on the color display 202. Under this condition, the user selects the directory by utilizing the keyboard 203 or the like at step 46. Furthermore, the processing proceeds to the next decision step 48, whereat it is determined whether or not the title is to be displayed. If the user selects a YES by the keyboard 203 or the like at step 48, then the processing proceeds to step 50. In step 50, the disc title is displayed on the color display 202. Under this condition, the disc title is selected by the user by utilizing the keyboard 203 or the like at step 52. If the disc title is selected by the user at step 52, the descriptors of all still pictures in the title are read-out 111 from the magneto-optical disc drive apparatus 103 at step 54, and then the search is ended. In this case, it is possible to select a plurality of titles.

If on the other hand the user selects a NO at step 42, then the processing proceeds to step 50 wherein the descripters of all still pictures in the disc are read-out 111 from the magneto-optical disc drive apparatus 103. Further, if the user selects NO at step 48, then the processing proceeds to step 56, whereat the descriptors of all still pictures in the directory selected at step 46 are read-out 111 from the magneto-optical disc drive apparatus 103.

Then, the descriptors thus read 111 are analyzed [12], and the addresses of the indexed picture and the full picture are stored 113. Simultaneously, in accordance with the analyzed addresses, the indexed picture is read-out 114 from the magneto-optical disc drive apparatus 103, and the index picture thus read-out is transferred to the memory apparatus 1A. The indexed picture thus transferred to the memory apparatus 1A is further transferred to the interface circuit 16. Therefore, the indexed still images thus classified and filed can be read-out from using either the descriptors of the disc, the directory and the title.

Figure 12:
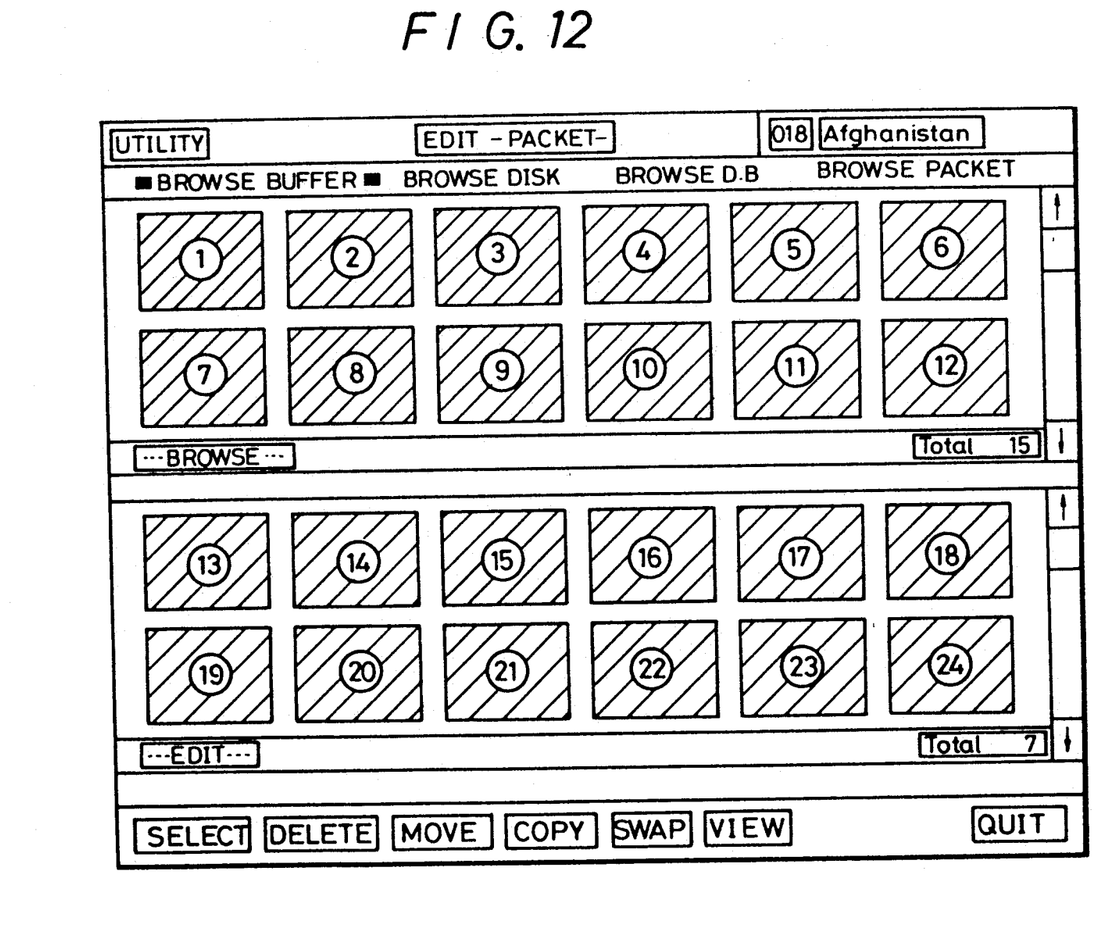
FIG. 12 is a schematic diagram useful in understanding the operation of the embodiment shown in FIG. 1.

The video signal interface circuit 16 is supplied with a background picture, which is shown in FIG. 12, from the CPU 201. In response to each of the addresses of the memory 16M corresponding to areas ① to ④ the upper half portion within this background picture, the above-described index pictures are sequentially written in by the address control 115. When the index pictures are searched, all indexed pictures are temporarily written in the memory apparatus 1A, if there are more than 13 sheets of index pictures therefore requiring additional pages of memory, the access of display to other pages can be performed at high speed.

On the other hand, areas ⑬ to ㉔, cross-hatched in FIG. 12, are prepared in the lower half portion of the background picture. Under the condition that the index pictures are respectively displayed on the above-described areas ① to ⑫, a desired cursor (not shown) is moved in the range of the desired still picture by the mouse 204 or the like. If a certain key operation or the like is carried out therein, a still picture corresponding to the selected area is identified 123 by the work station 2. Then, in accordance with this identification, the address of the full picture and the index picture of the desired still image are read-out from the address stored 113, whereby the full picture and the index picture read-out 116 from the magneto-optical disc drive apparatus 103 are written in the memory apparatus 1A and the index picture is written in the memory 16M at the address thereof corresponding to the area ⑬.

The above-described operation is hereinafter repeated, whereby the index pictures of the desired still images are sequentially displayed in the areas ⑬ to ㉔. Thus, the index pictures and the full pictures are sequentially written in the memory apparatus 1A in that order.

The editing is carried out as described above, whereby the packets of the still images which are arranged in a desired sequential order are completed in the memory apparatus 1A. Alternatively, these packets may be transferred to the magneto-optical disc drive apparatus 103, and filed in the magneto-optical disc.

The packets of the still images thus edited are transmitted as follows.

In the apparatus shown in FIG. 2, for example, the I/0 circuit 14a is served as an I/0 circuit for transmitting the packet, whereas the I/0 circuit 14b is connected with a monitor receiver (not shown). Further, the packet of the thus edited still image is transmitted under the condition that it is stored in the memory apparatus 1A.

When a transmission command is issued from the work station 2, then the first still image of the packet is transferred to the I/0 circuit 14a and then transmitted, and the second still image is transferred to the I/0 circuit 14b and displayed on the monitor receiver (not shown). Under this condition, if the transmission command is issued from the work station 2 one more time, the second still image of the packet is transferred to the I/0 circuit 14a and the transmission is carried out, whereas the third still image is transferred to the I/0 circuit 14b and displayed on the monitor receiver.

As described above, the still images of the thus edited packets are sequentially transmitted. In that case, each subsequent still image to be transmitted is displayed on the monitor receiver. When the user does not want to choose the next still image from the above-described display, processing such as deletion of the next still image or the like can be performed on the basis of the command from the work station 2.

As described above, according to the still image filing system of the present invention, the still picture and desired information thus set in response to the contents of the still image are mixed and displayed so that the information can be determined with ease. Further, the table for informations previously-set is displayed to assist the user.

In the above-described still image filing system of the present invention, together with the full picture and the index picture, a key picture (one pixel is formed of one bit) for carrying out a so-called key mixing may be provided within the still image.

Having described a preferred embodiment of the invention with reference to the accompanying drawings, it is to be understood that the invention is not limited to that precise embodiment and that various changes and modifications could be effected by one skilled in the art without departing from the spirit or scope of the invention as defined in the appended claims.

We claim as our invention

1. A still image filing system for storing still picture data representing the still image and for controlling the still picture data, comprising:
    still image filing means having an input means for receiving said still picture data, first memory means for storing pixels of said still picture data, separate second memory means for storing frames of said still picture data, an output means for outputting said still picture data, and a first central processing unit (CPU) for controlling the operation thereof;
    a horizontal period extracting circuit for extracting a predetermined horizontal period within a vertical blanking period; and
    a control unit including a second CPU and responsive to said horizontal period extracting circuit for switching between said first and second memory means and color display means for displaying said still picture image formed from said still picture data stored in said first and second memory means, wherein said still image filing means further includes a video bus through which the still picture data is transmitted in real time, and said input and output means are connected to said divide bus.

2. A still image filing system according to claim 1, wherein said still image filing means further includes first and second control buses for controlling the first and second memory means and a converting circuit controlled by said first and second control buses for converting said still pictured data in said first and second memory means and said first and second memory means are connected through said converting circuit to said video bus.

3. A still image filing system according to claim 2, further comprising a plurality of video buses of a plurality of still image filing means wherein said plurality of vide buses are connected to one another via a switching means.

4. A still image filing system according to claim 2, further including editing means for editing said still picture data to produce an edited still image and wherein a display screen of said color display means is divided into a plurality of display area, in which said still image which is read-out from said first or second memory means is displayed in one of said plurality of display areas, a still picture edited is displayed in of said plurality of one display areas with said edited still imaged displayed in another on of said display areas, and still image displayed on one display area is changed freely.

5. A still image filing system according to claim 2, wherein said first and second control buses provide control data from said central processing unit and said control data is transmitted such that it is superimposed upon a vertical blanking period of said video signal.

6. A still image filing system according to claim 1, further including editing means for editing said still picture data to produce an edited still image and wherein a display screen of said color display means is divided into a plurality of display areas, in which said still image is read-out from said first or second memory means and is displayed on one of said plurality of display areas, and said edited still image is displayed on another one of said plurality display areas and said edited still image is written in the first memory means.

7. A still image filing system according to claim 1, wherein a video signal formed by said still image filing means from said still picture data and a video signal formed by said second central processing unit (CPU) of said control unit are mixed and displayed on said color display means, and the wherein said video signal formed by the central processing unit in said control unit comprises desired information that is determined in response to a content of said video signal formed by said still image filing system.

8. A still image filing system according to claim 7, further comprising means for displaying a table for information previously determined so that a desired information is selected from said table and new information is set in said table after said desired information is selected.

9. A still image filing system according to claim 1, further comprising means for classifying a plurality of still images in a plurality of stages that are filed in said first and second memory means so that said still images of one of said plurality of stages can be searched without displaying classification from other stages of said plurality of stages so that, all of said plurality of which are sill images classified by said one or said plurality of stages can be generated.

10. A still image filing system according to claim 1, wherein said video signal from the central processing unit of said control unit is supplied to said color display means through said still image filing means, and a signal of a predetermined black level is provided in said video signal at a predetermined range thereof, whereby the video signal formed by said still image filing means is superimposed upon a range of said black level signal.

* * * * *

UNITED STATES PATENT AND TRADEMARK OFFICE
CERTIFICATE OF CORRECTION

PATENT NO. : 5,261,048

DATED : November 9, 1993

INVENTOR(S) : Akihiko Matsumoto and Fumihiro Nagasawa

Page 1 of 2

It is certified that error appears in the above-indentified patent and that said Letters Patent is hereby corrected as shown below:

On the title page:

```
   —           References Cited
                U.S. Patent Documents
       4,506,342  Yamamoto        364/900
                Foreign Patent Documents
       0083989   European Pat. Off.
       0122094   European Pat. Off.
       0258976   European Pat. Off.—
```

In the Abstract, line 7, change "(CPI)" to —(CPU)—

Col. 1, line 33, change "filling" to —filing—

Col. 2, line19, after"FIG. 1" insert —;—

Col. 3, line 65, after "Further" insert —,—

Col. 4, line 37, delete "the"

Col. 5, lines 25 & 26, delete "together"

lines 26 &27, change "function" to —functions—

Col. 6, line 56, delete "by"

line 66, change "exist" to —exists—

Col. 7, line 8, delete "a"

Col. 8, line 8, change "50" to —56— line 27, change "and" to —or— line 31, after "④" insert —cross-hatched in—

UNITED STATES PATENT AND TRADEMARK OFFICE
CERTIFICATE OF CORRECTION

PATENT NO. : 5,261,048
DATED : November 9, 1993
INVENTOR(S) : Akihiko Matsumoto and Fumihiro Nagasawa It is certified that error appears in the above-indentified patent and that said Letters Patent is hereby corrected as shown below:

Col. 10, line 4, change "divide" to --video--
line 17, change "vide" to --video--
line 67, change "classification" to --classifications--

Signed and Sealed this

Fifteenth Day of August, 1995

Attest:

BRUCE LEHMAN

Attesting Officer     Commissioner of Patents and Trademarks